United States Patent [19]

Kimura et al.

[11] 4,401,374
[45] Aug. 30, 1983

[54] INTERCHANGEABLE FINDER DEVICE

[75] Inventors: Makoto Kimura, Tokyo; Hiroshi Terunuma, Ichikawa, both of Japan

[73] Assignee: Nippon Kogaku K.K., Tokyo, Japan

[21] Appl. No.: 299,513

[22] Filed: Sep. 4, 1981

[30] Foreign Application Priority Data

Sep. 11, 1980 [JP] Japan .................. 55-126498

[51] Int. Cl.³ .................. G03B 7/08; G03B 13/02
[52] U.S. Cl. .................. 354/25; 354/152; 354/199; 354/219
[58] Field of Search ............ 354/25, 152, 154, 155, 354/156, 199, 200, 219, 222, 223

[56] References Cited

U.S. PATENT DOCUMENTS 4,047,207  9/1977  Altman et al. .............. 354/155
4,168,116  9/1979  Goldberg .................. 354/152
4,187,016  2/1980  Ishizaka .................. 354/152

Primary Examiner—Russell E. Adams
Attorney, Agent, or Firm—Shapiro and Shapiro

[57] ABSTRACT

An interchangeable finder device of a single lens reflex camera has a finder optical system in which a focusing screen, a pentaprism and an eyepiece are fixed in a predetermined positional relation, a casing containing the optical system therein, and a mounting-dismounting device provided on the casing to mount the casing to the camera body. The finder device further has a sliding mechanism for supporting the finder optical system slidably in a direction perpendicular to the focus surface of the focusing screen relative to the mounting-dismounting mechanism so that the finder optical system can move in said perpendicular direction independently of the mounting-dismounting device when the casing is mounted to the camera body by means of the mounting-dismounting device.

4 Claims, 5 Drawing Figures

INTERCHANGEABLE FINDER DEVICE

BACKGROUND OF THE INVENTION

1. Field of the Invention

This invention relates to an interchangeable finder device of a single lens reflex camera.

2. Description of the Prior Art

There has heretofore been proposed an automatic focus detecting interchangeable finder device of a single lens reflex camera which contains therein a focusing screen with a pentaprism, an eyepiece, etc. In this finder device, the positional relation among the pentaprism, the eyepiece, the focusing screen, etc. is fixed and therefore, the length of the optical path from the focusing screen to the eyepiece is always constant. This leads to an advantage that a predetermined visibility can always be obtained if the focusing screen can be fixed at a predetermined position when the finder device has been mounted to the camera body. Also, as regards a focus detecting optical system contained in this interchangeable finder device, the positional relation between the focus detecting optical system and the focusing screen is fixed and therefore, the distance from the focusing screen to a distance measuring light-receiving element is always constant. This leads to an advantage that no focus detection error will occur if the focusing screen can be fixed at a predetermined position when the finder device has been mounted to the camera body.

In such interchangeable finder device, however, the positional relation between the finder optical system including the focusing screen and the mounting-dismounting device is fixed and therefore, the positional relation between the focusing screen and the mounting-dismounting device must be predetermined so that the focusing screen lies at a predetermined position relative to the camera body when the finder device has been mounted to the camera body by means of the mounting-dismounting device. That is, high accuracy is required for making the positional relation between the focusing screen and the mounting-dismounting device into a predetermined positional relation.

SUMMARY OF THE INVENTION

It is an object of the present invention to provide an interchangeable finder device of a single lens reflex camera which does not require such high accuracy and which ensures the finder optical system including the focusing screen to be placed at a predetermined position relative to the camera body when the interchangeable finder device is mounted to the camera body.

The invention will become fully apparent from the following detailed description thereof taken in conjunction with the accompanying drawings.

DESCRIPTION OF THE PREFERRED EMBODIMENTS

Figure 1:
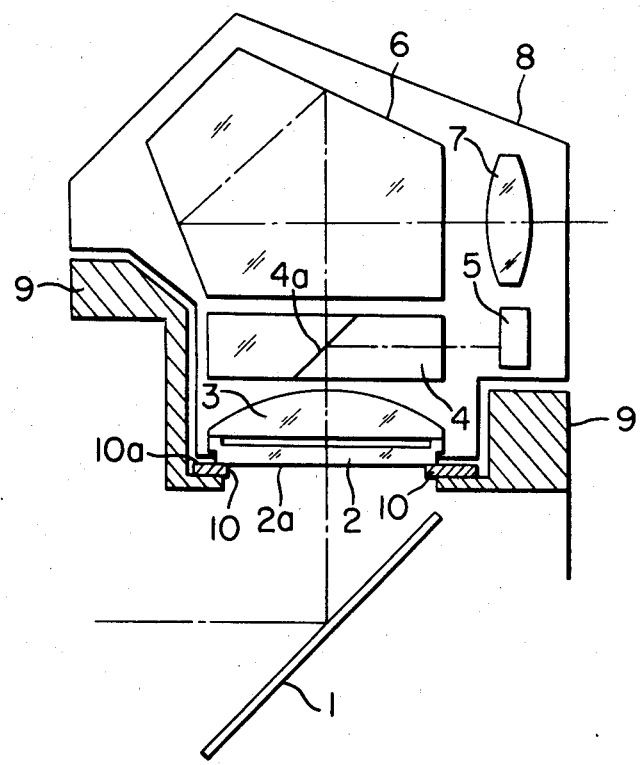
FIG. 1 is a longitudinal cross-sectional view schematically showing the optical system of the interchangeable finder device according to an embodiment of the present invention.
Figure 2:
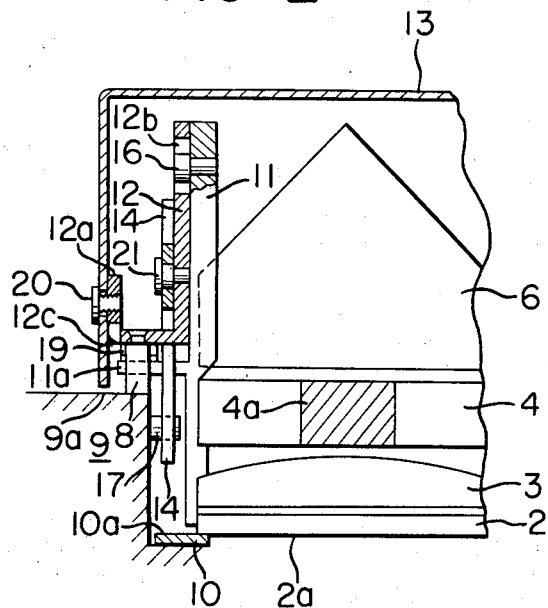
FIG. 2 is a cross-sectional view taken along line A—A of FIG. 3 and illustrating the relation chiefly between the optical system and the other elements in the embodiment.
Figure 3:
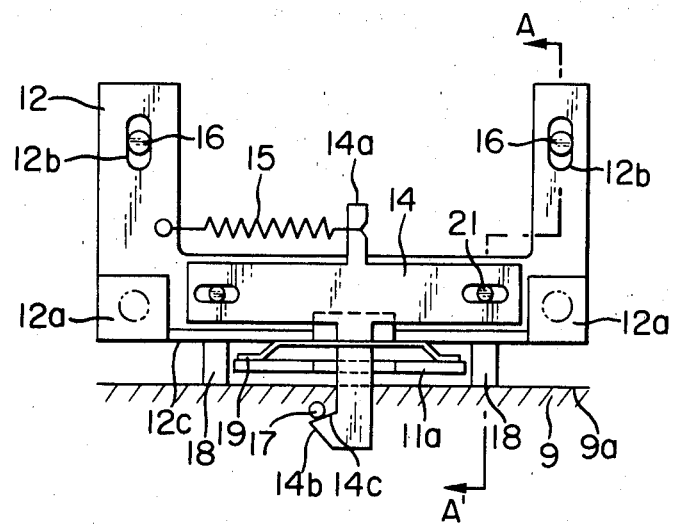
FIG. 3 shows resiliently coupled engaging portions in the embodiment.

FIGS. 1 to 3 show an embodiment of the present invention, FIG. 1 being a cross-sectional view of an automatic focus detecting interchangeable finder device which photoelectrically effects focus detection.

A focusing screen 2, a condenser lens 3, a prism 4, a pentaprism 6 and an eyepiece 7 together constitute the finder optical system in an embodiment of the present invention, and are integrally incorporated in a finder device 8. The light beam from a phototaking lens (not shown) is reflected by a reflecting mirror (quick return mirror) 1 within the camera body and travels toward the finder optical system, while the light beam entering the prism 4 via the focusing screen 2 and the condenser lens 3 and entering a semitransparent mirror 4a is partly reflected and travels toward a focus detecting light-receiving portion 5. The light beam passed through the prism 4 travels toward the photographer's eye via the pentaprism 6 and the eyepiece 7. The focusing screen 2, lenses 3 and 7, prisms 4 and 6 and light-receiving portion 5 are fixedly supported by a block 11 (FIG. 2) which will hereinafter be described.

As seen in FIG. 1, the focusing screen 2 is incorporated in the finder optical system and therefore, the lengths of the optical paths of both the focus detecting optical system 2, 3, 4 and the observation optical system 2, 3, 4, 6, 7 from the focusing screen are adjustable in an interchangeable finder. This is very effective for an optical system such as the focus detecting optical system in which a variation in the length of the optical path appears in the form of a remarkable focus detection error, and also gives rise to an advantage in the observation optical system that the visibility of the observed image does not create any irregularity by the attachment of the interchangeable finder device to the camera body.

FIGS. 2 and 3 show the relation between the interchangeable finder device as mounted to the camera body and the camera body.

The outer cover 13 of the finder device 8 and an attachment plate 12 are made integral with each other at an attachment portion 12a by a set screw 20, and a slide lever 14 for mounting and dismounting the interchangeable finder device is slidably supported on the attachment plate 12 by a pin 21. The slide lever 14 is operable by an operating member, not shown, which is provided on the outer wall of the outer cover 13. The attachment plate 12 has at least one vertically extending slot 12b which is slidably engaged by a guide pin 16 provided on the block 11 in the interchangeable finder device 8. The aforementioned elements 2–7 are fixed to the block 11.

A block biasing spring 19 is shown as a leaf spring and inserted between the flange portion 11a of the block 11 and the bottom surface 12c of the attachment plate 12 and imparts a biasing force in such a direction that the two are spaced away from each other. The slide lever 14 is biased by a spring 15 in a direction to engage an interchangeable finder fixing pin 17 projectedly provided on a mirror box 9. The mirror box 9 is fixed to the camera body and may be said to form a part of the camera body.

As is apparent from the drawings, the outer cover 13 covers the above-described optical system 2-7 and other elements 11, 12, 14–16, 18 and 19.

Operation will now be described. When the interchangeable finder device 8 is inserted into the mirror box 9 and depressed, the focus surface of the focus screen 2 in the lower portion of the block 11, namely, the underside 2a of the focusing screen 2, first bears closely against a focus frame 10 fixed to the mirror box 9, and the block 11 does not lower any more. When the cover 13 is further depressed, the attachment plate 12 made integral with the cover slides and is depressed against the force of the biasing spring 19 with the engagement between the pin 16 on the block 11 and the slot 12b in the attachment plate 12 as the guide. At this stage, the cam surface 14b of the slide lever 14 strikes against the upper surface of the fixing pin 17 provided in the mirror box 9 and the slide lever 14 slides against the force of the biasing spring 15. When the cam surface 14b rides across the pin 17, an inclined surface portion 14c comes into engagement with the pin 17, as shown in FIGS. 2 and 3. A positioning pin 18 fixed to the bottom surface of the attachment plate 12 bears against the upper surface 9a of the mirror box. In this manner, the mounting of the interchangeable finder device is completed.

As described above, the mounting-dismounting mechanism and outer portion of the interchangeable finder device are positioned relative to the camera body through the positioning pin 18 and independently thereof, the finder optical system is positioned by the contact between the focus frame 10 and the focusing screen 2 and therefore, when the interchangeable finder device 8 has been mounted to the camera body, the length of the finder optical path is not varied.

The above-described interchangeable finder device 8 may be removed from the camera body by sliding the lever 14 rightwardly as viewed in FIG. 3 by means of the aforementioned extraneously operable operating member (not shown).

In the present embodiment, the mounting-dismounting level 14 is supported on the outer cover 13 so that the cover 13 and the lever 14 assume a predetermined positional relation with respect to vertical direction, namely, a direction perpendicular to the focus surface of the focusing screen 2. The finder optical system 2, 3, 4, 6, 7 is supported in the outer cover 13 so that it is slidable in a direction perpendicular to the focus surface of the focusing screen 2, and the finder optical system 2, 3, 4, 6, 7 is biased by the biasing spring 19 so that it is urged toward the camera body. Thus, in the present embodiment, even if the relative positional relation between the mounting-dismounting lever 14 and the finder optical system 2, 3, 4, 6, 7 in the direction perpendicular to the focus surface 2a of the focusing screen 2 is not accurately set, the finder optical system 2, 3, 4, 6, 7 can be urged and fixed at a predetermined position in the camera body 9 whenever the interchangeable finder device is mounted to the camera body 9.

Even if the present embodiment is modified in the following manner, an effect similar to that described previously may be obtained. The finder optical system 2, 3, 4, 6, 7 may be fixed to the outer cover 13, the mounting-dismounting lever 14 may be supported on the outer cover 13 so that it is slidable in the direction perpendicular to the focus surface 2a of the focusing screen 2, and design may be made such that when the engagement between the lever 14 and the pin 17 has been achieved, the outer cover 13 and the finder optical system 2, 3, 4, 6, 7 are urged together toward the frame 10 by a biasing spring discrete from the spring 19. Even in this case, the finder optical system is slidable in the direction perpendicular to the focus surface 2a of the focusing screen relative to the mounting-dismounting lever 14, and even if the relative positional relation between the lever 14 and the finder optical system 2, 3, 4, 6, 7 in said perpendicular direction is not accurately set, the finder optical system 2, 3, 4, 6, 7 can be urged and fixed at a predetermined position in the camera body 9 whenever the interchangeable finder device is mounted to the camera body 9.

The embodiment hitherto described is an example of the case where the joined surface 9a of the camera body and the upper surface 10a of the focus frame 10 are parallel to each other and the undersides of the two pins 18 and the underside 2a of the focusing screen 2 are parallel to each other. In the aforedescribed embodiment, even if the positional relation in the direction perpendicular to the focus surface 2a between the mounting-dismounting lever and pin 14, 18 and the focusing screen 2 is not accurately set, the finder optical system including the focusing screen can be fixed in a predetermined positional relation relative to the camera body. Also, even if the distances between the surface and pin 9a and 17 and the focus frame 10 are irregular for each camera body, the finder optical system can be fixed in a predetermined positional relation relative to the camera body.

The embodiment which will now be described is one in which the finder optical system can be fixed in a predetermined positional relation relative to the camera body even if the surface 9a of the camera body and the upper surface 10a of the focus frame 10 are not accurately parallel to each other and even if the undersides of two pins 18 and the underside 2a of the focusing screen 2 are not accurately parallel to each other.

Figure 4:
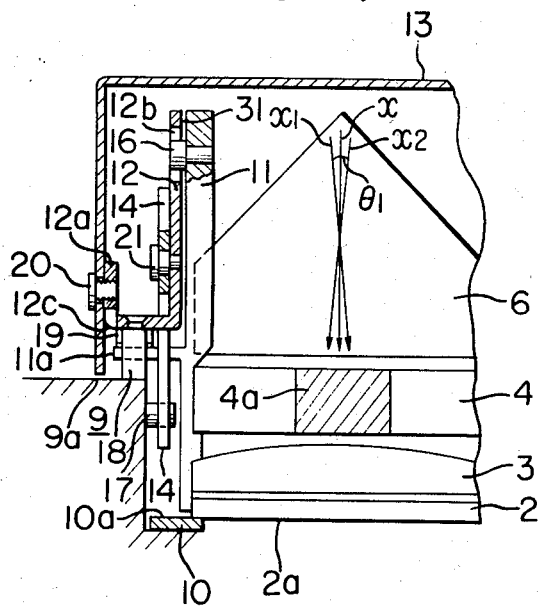
FIG. 4 is a view showing another embodiment of the present invention and corresponding to FIG. 2.
Figure 5:
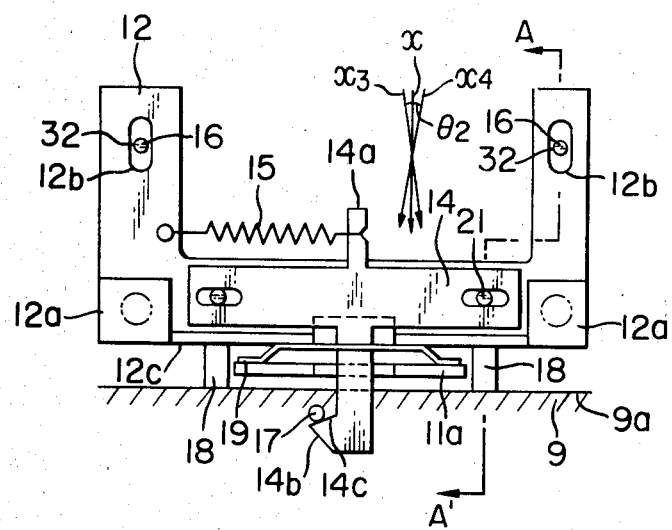
FIG. 5 is a view of said another embodiment corresponding to FIG. 3.

FIGS. 4 and 5, which show another embodiment of the present invention, correspond to FIGS. 2 and 3, respectively. In FIGS. 4 and 5, members functionally similar to those of FIGS. 1–3 are given similar reference characters and need not be described. This embodiment differs from the embodiment of FIGS. 1–3 in that a gap 31 is provided between the opposed surfaces of the block 11 and the attachment plate 12 and that the pin 16 has a smaller diameter than the width of the slot 12b so that a gap 32 is provided between the pin 16 and the slot 12b.

The interchangeable finder device 8 of the present embodiment is of the above-described construction and may be mounted to the camera body 9 in a manner similar to that described in connection with the embodiment of FIGS. 1–3. The present embodiment is similar to the previous embodiment in that the finder optical system moves relative to the outer cover 13 in the direction perpendicular to the focus surface 2a. The finder optical system of the present embodiment, due to the presence of the gap 31, may be inclined relative to the outer cover 13 within a certain angle range $\theta_1$ from the perpendicular direction x, a shown in FIG. 4. Also, the finder optical system of the present embodiment, as shown in FIG. 5, due to the presence of the gap 32, may be inclined relative to the outer cover 13 within a certain angle range $\theta_2$ from the perpendicular direction x. Accordingly, even if the upper surface 9a of the camera body and the upper surface 10a of the focus frame 10 are not accurately parallel to each other and even if the undersides of two pins 18 and the underside 2a of the focusing screen 2 are not accurately parallel to each other, the focusing screen 2 is always brought into intimate contact with the focus frame 10 because the finder optical system is slidable while being inclined within the angle ranges $\theta_1$ and $\theta_2$ relative to the cover 13. Thus, the finder optical system is fixed in a predetermined positional relation relative to the camera body. In other words, where the surface 9a and the surface 10a are not accurately parallel to each other and where the undersides of the two pins 18 and the surface 2a are not accurately parallel to each other, the outer cover 13 is mounted inclinedly relative to the finder optical system.

The present embodiment has been described above and, as in the embodiment of FIGS. 1-3, the finder optical system is slidable relative to the outer cover 13 in the direction perpendicular to the focus surface 2a of the focusing screen. Accordingly, as in the embodiment of FIGS. 1-3, even if the distances between the lever and pin 14, 18 and the focusing screen 2 are not accurately set and even if the distance between the surface 9a and the focus frame 10 is irregular for each camera body, the finder optical system can be fixed in a predetermined positional relation relative to the camera body.

In the illustrated embodiments, the positioning between the finder outer cover 13 and the camera body 9 is accomplished by the use of the pin 18, but if the positioning is effected between the lower end face of the cover 13 and the camera body, the gap between the finder device and the camera body can be reduced and this is effective for the dust-proof purpose.

According to the present invention, as has been described above in detail, the mounting-dismounting device and the finder optical system are discretely positioned relative to the camera body and the positional relation between the mounting-dismounting device and the finder optical system need not be accurately set in advance.

We claim:

1. In an interchangeable finder device of a single lens reflex camera having a finder optical system in which a focusing screen, a pentaprism and an eyepiece are fixed in a predetermined positional relation, a casing containing said optical system therein, and a mounting-dismounting device provided on said casing to mounting said casing to the camera body, the improvement comprising a sliding mechanism for supporting said finder optical system slidably in a direction perpendicular to the focus surface of said focusing screen relative to said mounting-dismounting mechanism so that said finder optical system can move in said perpendicular direction independently of said mounting-dismounting device when said casing is mounted to said camera body by means of said mounting-dismounting device.

2. The improvement recited in claim 1, wherein said interchangeable finder device further has biasing means for biasing said finder optical system in said perpendicular direction and urging said finder optical system against said camera body so that said finder optical system and said camera body assume a predetermined positional relation with respect to said perpendicular direction when said casing is mounted to said camera body by means of said mounting-dismounting device.

3. The improvement recited in claim 1, wherein said interchangeable finder device further has light-receiving means for receiving light passed through said focusing screen and producing an output corresponding to the focus adjusted condition of a phototaking lens, said light-receiving means being fixed in a predetermined positional relation with said finder optical system.

4. The improvement recited in claim 2, wherein said mounting-dismounting device is provided on said casing in a predetermined positional relation with respect to said perpendicular direction, and said finder optical system is slidable in said perpendicular direction relative to said mounting-dismounting device and said casing by said sliding mechanism.

* * * * *